J. H. Irwin,

Lantern.

No. 1850. Reissued Jan. 10. 1865.

Witnesses;
W. E. Marns
F. H. Brown

Inventor;
John H. Irwin

UNITED STATES PATENT OFFICE.

JOHN H. IRWIN, OF CHICAGO, ILLINOIS, ASSIGNOR TO JOHN H. IRWIN AND JAMES F. GRIFFIN.

IMPROVEMENT IN LANTERNS.

Specification forming part of Letters Patent No. 36,841, dated November 4, 1862; Reissue No. 1,850, dated January 10, 1865.

*To all whom it may concern.*

Be it known that I, JOHN H. IRWIN, of the city of Chicago, in the county of Cook and State of Illinois, have invented a new and useful Improvement in Lanterns; and I do hereby declare that the following is a full, clear, and exact description thereof, reference being had to the accompanying drawings, and the letters and figures marked thereon, which form part of this specification.

Figure 1:
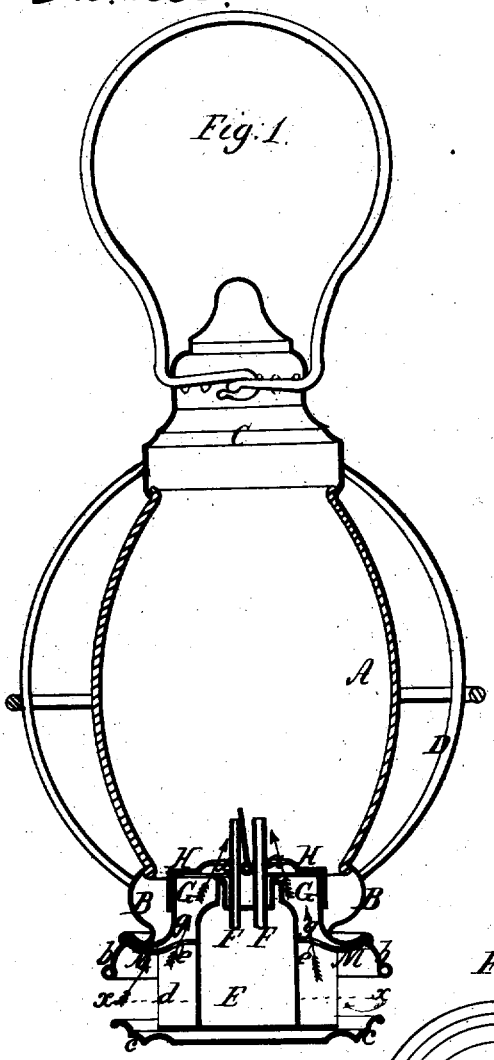
Figure 2:
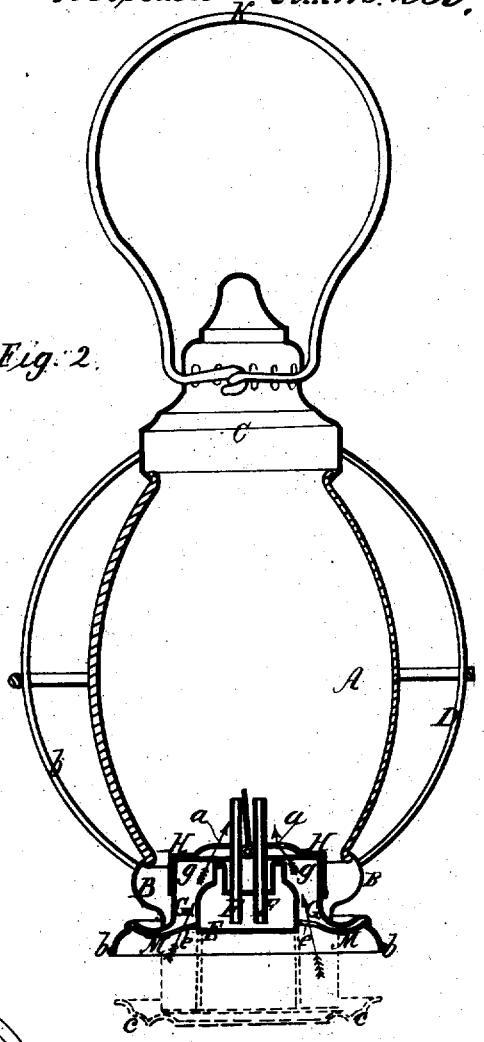
Figure 3:
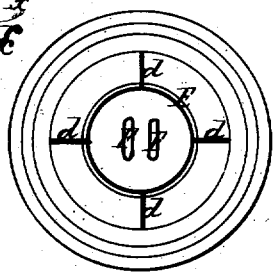

In said drawings, which are hereunto annexed, Figures 1 and 2 represent a central vertical section of my invention, and Fig. 3 represents a horizontal section at the line *x* in Fig. 1.

This invention has particular reference to lanterns in which kerosene or carbon oils are used as a burning material, and such oils can be used in lanterns constructed upon my improved plan without the usual draft-chimney.

My invention consists, first, in a novel device whereby the vacuum created around the flame by any sudden downward movement of the lantern is supplied with the requisite quantity of air to insure combustion and prevent the extinguishment of the light; second, in a novel device or combination of devices whereby a like result is secured whenever the lantern has given to it any sudden horizontal movement; and third, in a novel arrangement whereby the extinguishment of the light is prevented whenever the lantern is moved suddenly upward.

The main principle or mode of operation of my invention consists in supplying the requisite quantity of air to the flame in a lantern to keep up the combustion when the lantern has given to it any sudden downward or horizontal movement, by means of an annular passage surrounding the oil-cup, connecting with openings in the bottom and at the sides of the lantern as shown, and deflected at the top toward the wick-tube and below the flame, so that while the air is supplied to the flame in a sufficient quantity to effect the desired result, it is discharged from the said passage at such a distance from the flame that the current of air will not extinguish or blow out the light.

To prevent the extinguishment of the light by an upward movement of the lantern, I arrange a horizontal or slightly concave flange under the aforesaid openings in the bottom or beneath the flange proper of the lantern, at such a distance therefrom as will permit sufficient air to be gathered under the said upper flange to accomplish the desired result when the lantern is moved downward or horizontally. By means of this lower flange, which gathers the air in an upward motion, the downward or inverse draft through the lantern, occasioned by its upward movement, is to a great extent checked and counteracted, and thus the heated air in the top of the lantern-globe is, in a considerable degree, prevented from rushing down upon the flame and extinguishing it.

To enable those skilled in the art to understand, construct, and use my invention, I will proceed to describe the same with particularity, reference being made to the drawings hereunto appended.

E in the drawings represents the oil-cup of the lantern, provided with one or two flat wick-tubes (marked F F). A represents the glass globe or protector of the lantern, surrounded with the wire guards D, and C is its metallic top. G represents a circular jacket or inclosure surrounding the oil-cup and extending upward from the bottom M to the top of the oil-cup, forming a narrow space or passage between the oil-cup and jacket, which is marked *g* in the drawings. This inclosing jacket G is entirely open at the top, but is surmounted by the circular cap H, which fits closely upon and over it, as shown, and is provided at the center with a large circular opening, (marked *a*,) through the center of which the wick-tubes rise, as seen in the drawings. Thus the jacket G and cap H, arranged as shown, form a vertical passage around or upon the exterior of the oil-cup, extending from the bottom M to the top of the oil-cup, where it is deflected below the flame toward the wick-tubes, terminating and discharging at a considerable distance from them. It is obviously immaterial whether the said passage be formed by a jacket and cap in separate pieces, as herein described, or by a single piece of metal, as by having the jacket itself deflected or bent in at the top. In and through the bottom M and opening into and within the said passage *g*, between the oil-cup and jacket, there is a series of perforations or holes extending around the circumference of the oil-cup, (marked *e*,) of a sufficient number and size to admit the proper quantity of air into the passage *d* to effect the results contemplated in this invention.

The above-described arrangement of the jacket G, the cap H, provided with the opening *a*, as described, and the apertures *e*, in the bottom, below the flange *b*, constitute the device for providing against the extinguishment of the light by any sudden downward movement of the lantern, which operates for this purpose entirely independent of the other devices, hereinafter to be described, the operation being as follows: As the lantern is suddenly lowered, the air gathered in by the flange *b* is forced up through the holes *e* and passage *g*, the current being deflected by the cap H and discharged toward the wick-tube and below the flame, where the said upward current concentrates and rises up to the flame, thus supplying it with the requisite amount of air, while at the same time the force of the current as it reaches the flame is not strong enough to extinguish it.

The flange *b*, projecting outward and downward, as shown, is rendered useful in consequence of the lower flange, *c*, being arranged under the holes *e*, for the purposes before specified. For, although the flange *c* is placed at a considerable distance below the bottom M, still it is evident that it will interfere somewhat with the operation of the device for providing against the effects of downward movements. To obviate this objection and obtain sufficient air to support the flame in a downward motion, the flange *b*, is employed, which, but for the reason just stated, would be unnecessary.

In order to provide against the effects of side or horizontal movements upon the same principle as above described, it is only necessary to have the passage *g* provided with a lateral opening, so as to catch the air and supply it to the flame as before, when the lantern is moved sidewise.

To accomplish this last result, I make certain additions to my lantern, as above described. I first extend the oil-cup down below the flange *b* and bottom M a suitable distance, and then place upon the bottom of the oil-cup when thus prolonged the flange *c*, as shown. In the space between the two flanges *b* and *c* there is arranged a series of vertical plates, (marked *d*,) arranged radially with respect, to the lamp, and fitting closely to it, the lower ends of said plates being attached to the flange *c* and the upper ends to the bottom M. The purpose of these vertical radial plates *d* is to catch or gather the air when the lantern is moved laterally, and drive it up through the holes *e* and passage *g* to the flame, as in the case of a downward motion, as without these partitions or plates the air would pass directly through between the flanges; and thus the extinguishment of the light is prevented when the lantern is suddenly moved laterally or horizontally, by means of the device or arrangement last described, when used in combination with the device for providing against downward movements. When the lantern is moved upward, the flange *c*, gathering the air, resists, and to a great degree prevents, the downward draft through the lantern, which has a great tendency to extinguish the light in consequence of the heated air rushing down upon the flame.

It may be observed that this downward draft through the lantern occurs not only when the lantern is moved upward, but also when it is swung or oscillated from side to side, and while the effect of the said lower flange is to counteract this evil to a great degree, yet in itself it is not enough to fully accomplish the result aimed at, and there will still be a downward tendency of the heated air in the lantern, which, if brought in contact with the flame, is sure to extinguish it. In providing against this result, the construction of the passage *g* plays a prominent if not an indispensable part. It will be observed that the passage terminates at a considerable distance from the wick-tubes. Now, if the upper mouth or discharge of the passage was continued up to the wick-tube or the flame, not only would the incoming current of air blow out the flame, but the downward draft, in seeking an outlet through said passage, would of necessity be drawn directly upon the flame, and its extinguishment be inevitable; but, by my construction of this passage for the air, (marked *g*,) the discharge is located at a distance from the flame laterally as well as below it, so that in case of downward drafts the heated air in seeking an outlet through said passage is drawn away from the flame and the extinguishment thereof thereby prevented.

It is obvious that the herein described device for preventing the extinguishment of the light in a downward movement, which is shown in full lines in Fig. 2, not only operates wholly independent of the provisions for guarding against the like result in an upward or horizontal movement, which are represented in dotted lines in said Fig. 2, but that the said last-mentioned provisions, especially the lower flange, interfere more or less with the operation of said first-mentioned device.

It is likewise evident that the said provisions for the upward and lateral movements may be omitted without impairing or affecting the operation of the device for preventing the extinguishment of the flame by downward movements, or affecting the general principle of my invention, whenever it may be desired to construct a lantern to provide against the effect of a downward motion only, the lamp or oil-cup being shortened in that case as much as the addition of said provisions required it to be prolonged.

Having fully described my improvement in lanterns, I will specify what I claim therein, and desire to secure by Letters Patent—

1. The cap or deflector H, arranged below the top of the wick-tubes, and operating substantially in the manner and for the purposes herein specified and set forth.

2. The combination of the jacket G and deflector H, forming the deflected air-passage *g*, with the holes *e*, all arranged and operating substantially as and for the purposes herein shown and described.

3. In combination with the jacket G, deflector H, and holes *e*, the prolonged oil-cup E and vertical plates *d*, arranged and operating substantially as and for the purposes described.

JOHN H. IRWIN.

Witnesses:
W. E. MAUS,
J. F. GRIFFIN.